(12) United States Patent
Jeong et al.

(10) Patent No.: US 11,746,019 B2
(45) Date of Patent: Sep. 5, 2023

(54) METHOD FOR PRODUCING CONGLOMERATION GRAPHITE

(71) Applicant: Young Woon Jeong, Pyeongtaek-si (KR)

(72) Inventors: Young Woon Jeong, Pyeongtaek-si (KR); Jeong Hun Oh, Hwaseong-si (KR)

(73) Assignee: Young Woon Jeong, Pyeongtaek-si (KR)

( * ) Notice: Subject to any disclaimer, the term of this patent is extended or adjusted under 35 U.S.C. 154(b) by 0 days.

(21) Appl. No.: 17/928,854

(22) PCT Filed: Aug. 11, 2020

(86) PCT No.: PCT/KR2020/010578
§ 371 (c)(1),
(2) Date: Nov. 30, 2022

(87) PCT Pub. No.: WO2021/246571
PCT Pub. Date: Dec. 9, 2021

(65) Prior Publication Data
US 2023/0192498 A1 Jun. 22, 2023

(30) Foreign Application Priority Data
Jun. 3, 2020 (KR) .................. 10-2020-0067265

(51) Int. Cl.
*C01B 32/21* (2017.01)

(52) U.S. Cl.
CPC .......... *C01B 32/21* (2017.08); *C01P 2004/03* (2013.01); *C01P 2004/50* (2013.01); *C01P 2004/61* (2013.01); *C01P 2006/40* (2013.01)

(58) Field of Classification Search
CPC .. C01B 32/21; C01P 2004/03; C01P 2004/50; C01P 2004/61; C01P 2006/40
See application file for complete search history.

(56) References Cited

U.S. PATENT DOCUMENTS 8,980,787 B2   3/2015   Minoura et al.

FOREIGN PATENT DOCUMENTS

| CN | 101654239 A | 2/2010 |
|---|---|---|
| CN | 102530933 A | 7/2012 |

(Continued)

OTHER PUBLICATIONS

Kwon, Ou Jung et al. "A simple preparation method for spherical carbons and their anodic performance in lithium secondary batteries", Journal of Power Sources, 2004, vol. 125, pp. 221-227.

(Continued)

*Primary Examiner* — Andrew J. Oyer
(74) *Attorney, Agent, or Firm* — YOU & IP LLC; Wansik You

(57) ABSTRACT

Disclosed is a method for producing rough spherical graphite, whereby rough spherical graphite can be mass-produced at low cost with high efficiency. The method comprises: a) a step for pulverizing natural flake-shaped graphite; b) a step for mixing the pulverized natural graphite of step a) and a liquid pitch including a solvent and pitch; c) a step for removing the entirety or a portion of the solvent from the mixture of step b) for which mixing has been completed; d) a step for producing a rough spherical graphite by rough spheroidizing the mixture of step c) from which the solvent has been removed; e) a step for heat-treating the rough spheroidized graphite of step d); and f) a step for classifying the heat-treated rough spherical graphite of step e).

12 Claims, 3 Drawing Sheets

(56) References Cited

FOREIGN PATENT DOCUMENTS

| | | | |
|---|---|---|---|
| CN | 104103820 | A | 10/2014 |
| CN | 105271197 | A | 1/2016 |
| CN | 106058211 | A | 10/2016 |
| CN | 106169584 | A | 11/2016 |
| JP | 2004-210634 | A | 7/2004 |
| JP | 2013-001576 | A | 1/2013 |
| KR | 10-2003-0087986 | A | 11/2003 |
| KR | 10-2014-0085767 | A | 7/2014 |
| KR | 10-1426195 | B1 | 8/2014 |

OTHER PUBLICATIONS

Office Action to a corresponding Chinese Patent Application 2020801014950, (2020).
Office Action to Japanese Patent Application No. 2022-574227 from Japanese Patent Office, (2023).

METHOD FOR PRODUCING CONGLOMERATION GRAPHITE

TECHNICAL FIELD

The present invention relates to a novel method for producing conglomeration graphite. Particularly, the present invention relates to, when spherical graphite having a particle diameter of several tens of nanometers is obtained from flaky natural graphite through a mechanical process, a novel method for producing conglomeration graphite from natural graphite discarded in the mechanical process.

BACKGROUND ART

With the recent growths of notebook-type personal computers, and portable devices such as mobile phones based on 5G communication, the demand for batteries is rapidly increasing, and the uses of batteries are also expanding. A battery required in response to such a situation is a lithium ion secondary battery that satisfies the miniaturization and weight reduction of the battery. For the high performance of the lithium secondary battery, a carbonaceous material such as graphite is used as an anode active material of the battery.

Graphite of carbonaceous material used as the anode active material for the secondary battery should be used in a spherical form for the charge/discharge efficiency of the battery, and more preferably, it should be used in a crystalline spherical form. Various methods for producing spherical graphite used as the anode active material for the secondary battery are known.

On the other hand, in general, the higher the crystallinity of graphite, the more regular the crystallinity grows and flaky. Accordingly, as one method for obtaining crystalline spherical graphite desirable as the anode active material for the secondary battery, a method for processing flaky natural graphite collected from natural resources into a spherical shape through mechanical process such as crushing, refining, pulverization, and sorting is used. However, the yield of the method for obtaining crystalline spheroidal graphite from flaky natural graphite by the mechanical process is about 30% or less, and the remaining 70% or more is discarded in the mechanical process.

The flaky natural graphite can be purchased inexpensively, but the production efficiency of crystalline spheroidal graphite from flaky natural graphite is as low as about 30% as described above. As a result, it is expensive to produce crystalline spheroidal graphite.

Therefore, it is necessary to develop a new method for producing conglomeration graphite, which is capable of increasing the utility of discarded flaky natural graphite and allowing mass production with high efficiency and relatively easy to manufacture.

SUMMARY OF INVENTION

Technical Problem

An object of the present invention is to provide a method for producing conglomeration graphite by using discarded natural graphite, which is high-efficiency, low-cost, easy to manufacture, and capable of mass production.

Solution to Problem

In order to accomplish the above object, a novel method for producing conglomeration graphite according to the present invention includes steps of:

a) pulverizing flaky natural graphite ('natural graphite pulverization step');
b) mixing the pulverized natural graphite of the step a) with a liquid pitch including a solvent and pitch ('mixing step');
c) removing all or part of the solvent from a mixture in which the mixing of the step b) is completed ('solvent removal step');
d) preparing conglomerated graphite by conglomerating the mixture of the step c) from which the solvent is removed ('conglomeration step');
e) heat-treating the conglomerated graphite of the step d) ('heat treatment step'); and
f) classifying the heat-treated conglomerated graphite of the step e) ('classification step').

Advantageous Effects

The novel method for producing conglomeration graphite according to the present invention has advantages of mass production because of low cost, high efficiency, and ease of manufacture.

DESCRIPTION OF BEST MODE

Figure 1:
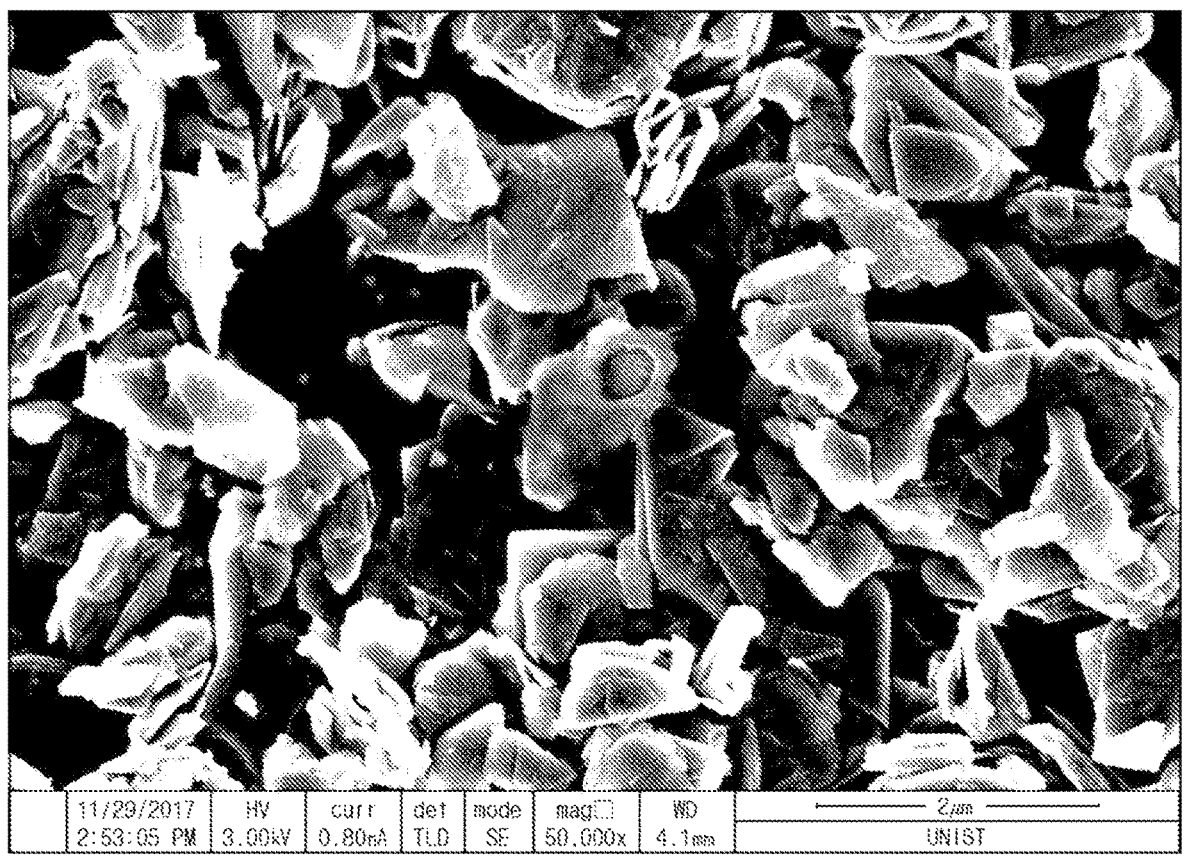
FIG. 1 is an SEM image showing natural graphite particles prepared at step a) of the first embodiment of a method for producing conglomeration graphite according to the present invention.

In the following, only parts necessary for understanding embodiments of the present invention will be described, and descriptions of other parts will be omitted in the scope not disturbing the subject matter of the present invention.

The terms and words used herein should not be construed as limited to ordinary or dictionary definition, and should be construed in light of the meanings and concepts consistent with the subject matter of the present invention on the basis of the principle that the inventor can properly define his own invention as the concept of the term to describe it in the best way. It is therefore to be understood that embodiments disclosed herein are merely exemplary and various equivalents or modifications thereof are possible.

The present invention provides a method for producing conglomeration graphite allowing mass production at low cost with high efficiency.

The method for producing conglomeration graphite according to an embodiment of the present invention includes steps of:

a) pulverizing flaky natural graphite ('natural graphite pulverization step');
b) mixing the pulverized natural graphite of the step a) with a liquid pitch including a solvent and pitch ('mixing step');
c) removing all or part of the solvent from a mixture in which the mixing of the step b) is completed ('solvent removal step');

d) preparing conglomerated graphite by conglomerating the mixture of the step c) from which the solvent is removed ('conglomeration step');

e) heat-treating the conglomerated graphite of the step d) ('heat treatment step'); and f) classifying the heat-treated conglomerated graphite of the step e) ('classification step').

Hereinafter, the steps a) to f) will be described in detail.

In the method for producing conglomeration graphite according to the present invention, the 'flaky natural graphite' of the step a) may have an average particle diameter of 5 to 500 µm, preferably 5 to 100 µm, and when the average particle diameter exceeds 500 µm, it is not economically desirable because the overall production time increases.

In the method for producing conglomeration graphite according to the present invention, the pulverization of natural graphite at the step a) is performed using a high-speed mechanical milling machine such as a hammer mill, a jet mill, a bead mill, or a combination thereof; preferably using the jet mill. In this case, a working pressure of the hammer mill, the jet mill, or the bead mill is a pressure required for each mill, and a pressure in case of pulverization using the jet mill is 5.5 to 9.9 bar.

In addition, among pulverized products of natural graphite obtained from the flaky natural graphite through the pulverization process with the jet mill or the like as described above, only natural graphite particles having an average particle diameter of 1 µm or less and a tap density of 0.2 to 0.3 g/cc are classified and selected using an ultra-fine classifier such as Turbo. Such classified and selected natural graphite particles with an average particle diameter of 1 µm or less are called 'pulverized natural graphite'.

As shown in the SEM image of FIG. 1, the 'pulverized natural graphite' has an acute angle portion on its surface.

In the method for producing conglomeration graphite according to the present invention, the amount of solvent and pitch used in 'the liquid pitch including solvent and pitch' at the 'mixing step' of the step b) ranges from 80:20 to 50:50 by weight percent.

The solvent may be any solvent capable of dissolving the pitch, preferably one or more selected from the group consisting of mineral oil such as kerosene, heavy oil, light oil; hydrocarbon solvent such as toluene or decane; heteroatom-containing solvent such as acetone, tetrahydropurine, or pyridine; and mixtures thereof, and more preferably mineral oil such as kerosene, heavy oil, light oil.

The pitch is petroleum-based pitch, coal-based pitch, or polymer resin, preferably petroleum-based pitch.

The viscosity of the liquid pitch is 2,000 to 20,000 cP.

In the method for producing conglomeration graphite according to the present invention, the amount of 'the pulverized natural graphite and the liquid pitch' used at the 'mixing step' of the step b) ranges from 80:20 to 50:50 by weight percent.

At the mixing ratio of the above range, the spheroidization of the pulverized natural graphite, which mostly exhibits a flaky form, is achieved well. If the amount of the used liquid pitch is smaller than 20% by weight percent, the spheroidization of the pulverized natural graphite is not made in part. Thus, the pulverized natural graphite that is not granulated may increase, so that the production efficiency of the conglomeration graphite will decrease. In addition, if the amount of the used liquid pitch is greater than 50% by weight percent, a difference in the average particle diameter of the produced conglomeration graphite becomes large. Thus, a problem may occur in the production yield of the conglomeration graphite particles having a particle diameter that can be used as an anode active material for secondary batteries.

In the method for producing conglomeration graphite according to the present invention, the mixing at the 'mixing step' of the step b) is performed by stirring a mixture of the liquid pitch and the pulverized natural graphite with a mixer such as a screw mixer at a speed of 100 to 800 rpm for 2 to 8 hours at a temperature of 50 to 200° C.

If it is out of the range of the above mixing time, the production efficiency of the conglomeration graphite is lowered. Also, even in the case where the step b) is not performed as shown in first and second comparative examples to be described below, the production efficiency of the conglomeration graphite is greatly reduced (see the first and second comparative examples).

In the method for producing conglomeration graphite according to the present invention, the solvent removal at the 'solvent removal step' of the step c) is performed under a reduced pressure. The degree of reduced pressure used may be a reduced pressure capable of removing 50% or more, preferably 70% or more, more preferably 80% or more of the solvent used, and the time taken for solvent removal may be determined in connection with the reduced pressure. In a preferred example, 80% or more of the solvent was removed for 1 hour under a reduced pressure of 50 torr. The solvent removal using the vacuum pressure is performed at room temperature.

In the method for producing conglomeration graphite according to the present invention, the 'conglomeration step' of the step d) is a step of preparing conglomerated graphite by using a conglomerating machine from the reduced pressure-treated mixture of the step c).

The conglomerating machine is a rotatable machine well known in the art and is preferably a machine in which a blade is formed on a rotor to apply friction and shear stress to the reduced pressure-treated mixture during rotation. It seems that the spheroidization of the pulverized graphite is caused by the friction and shear stress applied to the reduced pressure-treated mixture.

The conglomerating machine operates with a rotational force of 3,000 to 8,000 rpm, and preferably operates with a rotational force of 4,500 to 6,000 rpm. In addition, the operating time at the above rotational force is 100 to 600 seconds, preferably 150 to 400 seconds. If it is out of the range of the rotational force and operating time, the production efficiency of the conglomeration graphite is lowered.

In the method for producing conglomeration graphite according to the present invention, the 'heat treatment step' of the step e) is a step of heat-treating the conglomerated graphite prepared at the conglomeration step of the step d). Through this, the pitch and/or solvent used is carbonized, impurities are removed, and the surface properties of the conglomerated graphite is improved.

The heat treatment temperature is 200 to 500° C., preferably 300 to 400° C., and more preferably 350 to 400° C.

The time for the heat treatment is 0.5 to 2.5 hours, preferably 1 to 2 hours.

Finally, in the method for producing conglomeration graphite according to the present invention, the 'classification step' of the step f) is a step of classifying the conglomerated graphite carbonized, impurity-removed, and having improved surface properties through the heat treatment of the step e).

The classification step is to remove fine powder of a specific size or less from among the conglomerated graphite particles prepared at the 'heat treatment step' of the step e). In this case, the specific size may have a particle size (D50) in the range of 5 to 30 µm, preferably 8 to 25 µm. This particle size is a size that can be used in respective industries, for example, in the anode material industry of secondary batteries.

The classification step uses an air classifier well known in the art. The conglomeration graphite having a particle size (D50) smaller than 5 µm or larger than 30 µm obtained by classification may be supplied again to the 'natural graphite pulverization step' of the step a) or used for other industries.

Figure 2:
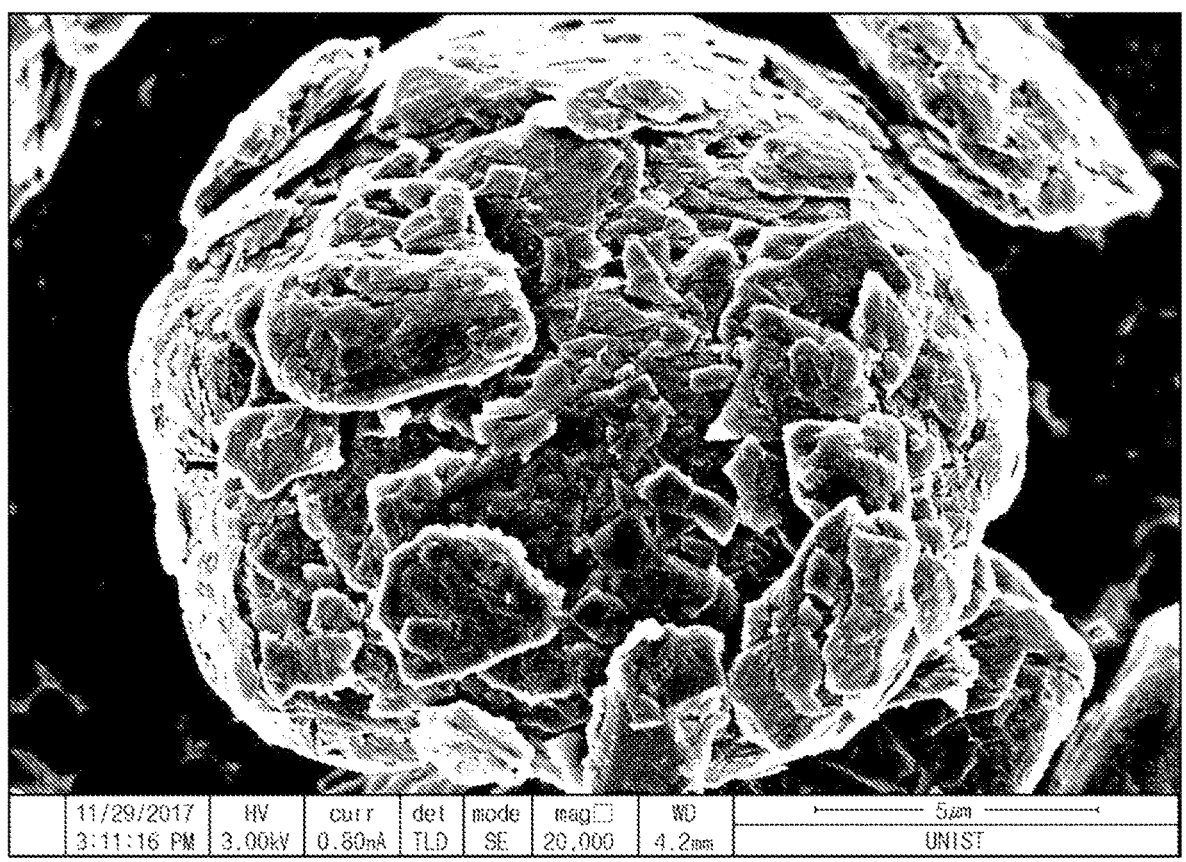
FIG. 2 is an SEM image showing one conglomeration graphite produced according to the first embodiment of the present invention.
Figure 3:
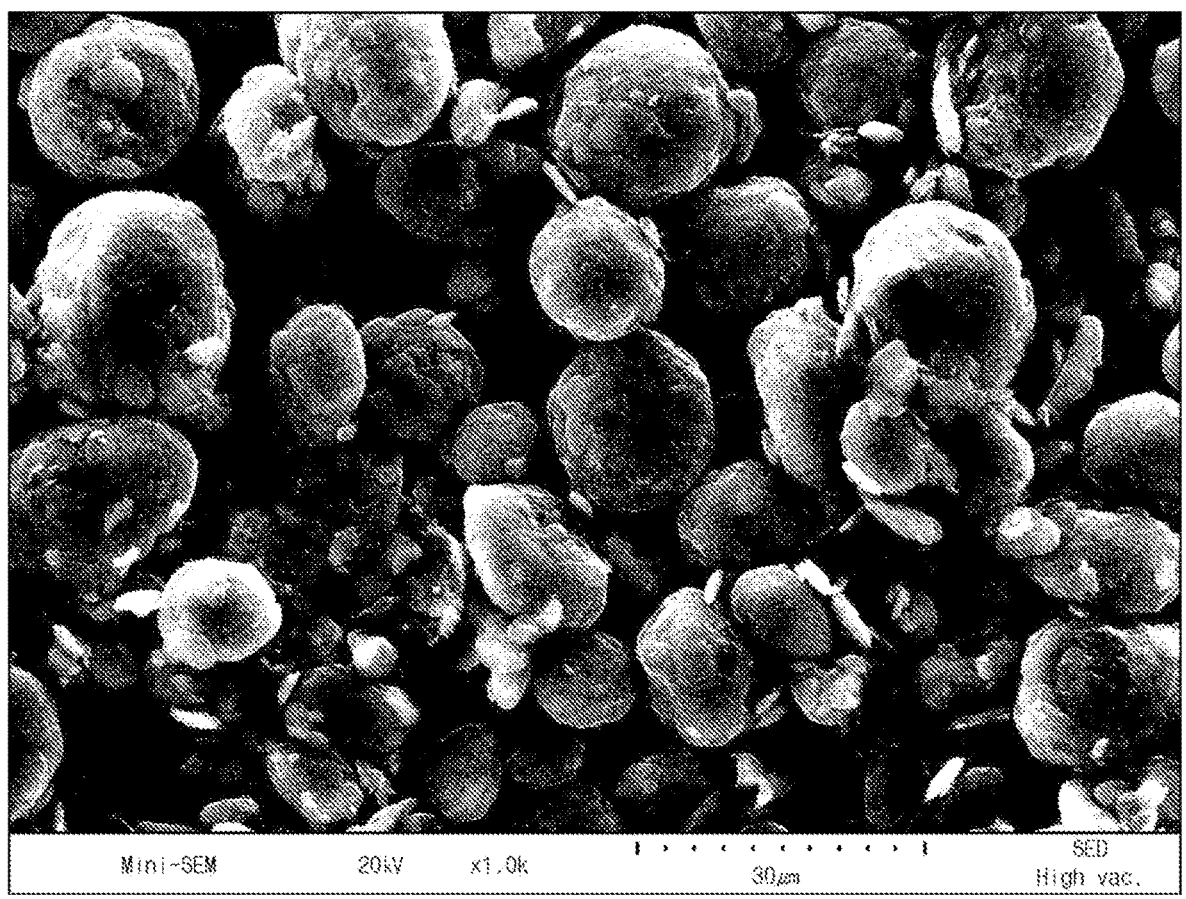
FIG. 3 is an SEM image showing aggregate of conglomeration graphite produced according to the first embodiment of the present invention.

One particle of the conglomeration graphite produced by the method for producing the conglomeration graphite according to the present invention including the above-described steps a) to f) is shown in the SEM image of FIG. 2, and the SEM image of FIG. 3 shows aggregate of the produced conglomeration graphite. As shown in the SEM images of FIGS. 2 and 3, the conglomeration graphite produced by the producing method according to the present invention has a spherical shape.

DESCRIPTION OF EMBODIMENTS

Hereinafter, the present invention will be further described through various embodiments. The following embodiments are intended to illustrate or specifically describe the present invention, and the scope of the present invention is not limited thereto.

In addition, since the contents not described herein can be sufficiently inferred by those skilled in the art, the description thereof will be omitted.

First Embodiment

A flaky natural graphite raw material having a size of 5 to 100 µm was pulverized using a jet mill set at a pulverization pressure of 5.5 to 9.9 bar, and natural graphite particles having an average particle diameter of 1 µm or less were selectively classified using a turbo classifier which is an ultra-fine classifier ('the step a)'). Then, 700 parts by weight of kerosene and 300 parts by weight of petroleum pitch were put in a screw mixer and the pitch was dissolved for 1 hour to prepare a liquid pitch. Also, 300 parts by weight of the prepared liquid pitch and 700 parts by weight of natural graphite particles having an average particle diameter of 1 µm or less were placed in a screw mixer and mixed at a speed of 200 rpm for 5 hours at a temperature of 150° C. ('the step b)'). After the mixing was completed, the kerosene component was removed more than 80% by using a vacuum pump at 50 torr vacuum pressure for 1 hour ('the step c)'). The reduced pressure-treated mixture was placed in a conglomerating machine and processed at 4,500 rpm for 260 seconds to prepare conglomerated graphite ('the step d)'). The prepared conglomerated graphite was heat-treated at 350° C. for 1 hour ('the step e)'). The final conglomeration graphite was obtained by removing fine powder generated during processing from the heat-treated conglomerated graphite through an air classifier ('the step f').

Second Embodiment

The final conglomeration graphite was produced by the same method as in the first embodiment, except that the step d) of the first embodiment was changed to a step in which 'the reduced pressure-treated mixture was placed in a conglomerating machine and processed at 4,500 rpm for 150 seconds to prepare conglomerated graphite'.

Third Embodiment

The final conglomeration graphite was produced by the same method as in the first embodiment, except that the step d) of the first embodiment was changed to a step in which 'the reduced pressure-treated mixture was placed in a conglomerating machine and processed at 4,500 rpm for 350 seconds to prepare conglomerated graphite'.

Fourth Embodiment

The final conglomeration graphite was produced by the same method as in the first embodiment, except that the step d) of the first embodiment was changed to a step in which 'the reduced pressure-treated mixture was placed in a conglomerating machine and processed at 6,000 rpm for 170 seconds to prepare conglomerated graphite'.

Fifth Embodiment

The final conglomeration graphite was produced by the same method as in the first embodiment, except that the step d) of the first embodiment was changed to a step in which 'the reduced pressure-treated mixture was placed in a conglomerating machine and processed at 3,500 rpm for 600 seconds to prepare conglomerated graphite'.

First Comparative Example

The final conglomeration graphite was produced by the same method as in the first embodiment, except that the step b) of the first embodiment was changed to a step in which '700 parts by weight of kerosene and 300 parts by weight of petroleum pitch were put in a screw mixer, the pitch was dissolved for 1 hour to prepare a liquid pitch, and 300 parts by weight of the prepared liquid pitch and 700 parts by weight of natural graphite particles having an average particle diameter of 1 µm or less were placed in a screw mixer and mixed at a speed of 200 rpm for 0.5 hours at a temperature of 150° C.'.

Second Comparative Example

The final conglomeration graphite was produced by the same method as in the first embodiment, except that the steps b) and c) of the first embodiment were changed to one step in which '900 parts by weight of natural graphite having an average particle diameter of 1 µm or less and 100 parts by weight of petroleum pitch having an average particle diameter of 4 µm were placed in a conglomerating machine and processed at 4,500 rpm for 260 seconds'.

Table 1 below shows the yield, sphericity, particle size (D50), tap density, and specific surface area of the conglomeration graphite produced under the process conditions of the first embodiment to the fifth embodiment and the first and second comparative examples.

The yield was measured as a weight ratio before/after air classification, the sphericity was measured through SEM analysis, and each of the particle size (D50), the tap density, and the specific surface area were analyzed.

TABLE 1

| | Conglomeration graphite | | | | |
|---|---|---|---|---|---|
| | Yield (%) | Particle size (D50), μm | Sphericity (long/short) | tap density, g/cc | specific surface area, m²/g |
| 1st Embodiment | 71 | 15 | 1.1 | 0.82 | 6.2 |
| 2nd Embodiment | 85 | 8 | 1.3 | 0.85 | 6.5 |
| 3rd Embodiment | 60 | 23 | 1.2 | 0.77 | 5.9 |
| 4th Embodiment | 68 | 15 | 1.2 | 0.86 | 5.8 |
| 5th Embodiment | 18 | 12 | 1.4 | 0.76 | 8.6 |
| 1st Comp. Ex. | 12 | 14 | 1.3 | 0.75 | 9.1 |
| 2nd Comp. Ex. | 7 | 15 | 1.3 | 0.74 | 9.3 |

In Table 1, the first to fifth embodiments are to perform the method for producing conglomeration graphite including the steps a) to f) of the present invention. The first comparative example is to mix the pulverized natural graphite with the liquid pitch for "0.5 hours" which is out of the range of '2 to 8 hours' that is the mixing time of the pulverized natural graphite and the liquid pitch at the 'mixing step of the step b)' in the method for producing conglomeration graphite according to the present invention, and the second comparative example is to omit the 'mixing step of the step b)' in the method for producing conglomeration graphite according to the present invention.

From Table 1, it can be seen that the first to fifth embodiments regarding the method for producing conglomeration graphite have significantly higher production efficiency of the conglomeration graphite compared to the first and second comparative examples.

INDUSTRIAL APPLICABILITY

As described above, the novel method for producing conglomeration graphite according to the present invention includes the step of pulverizing flaky natural graphite, which is discarded during a conventional process of producing conglomeration graphite from flaky natural graphite, and mixing it with liquid pitch, so that there is an advantageous effect on mass production of crystalline conglomeration graphite because of increasing the efficiency of producing the conglomeration graphite from the flaky natural graphite and reducing production cost.

What is claimed is:

1. A method for producing conglomeration graphite, comprising steps of:
a) pulverizing flaky natural graphite;
b) mixing the pulverized natural graphite of the step a) with a liquid pitch including a solvent and pitch;
c) removing all or part of the solvent from a mixture in which the mixing of the step b) is completed;
d) preparing conglomerated graphite by conglomerating the mixture of the step c) from which the solvent is removed;
e) heat-treating the conglomerated graphite of the step d); and
f) classifying the heat-treated conglomerated graphite of the step e),
wherein an average particle diameter of the pulverized natural graphite of step a) is 1 μm or less and a tap density of the pulverized natural graphite of step a) is 0.2 to 0.3 g/cc,
wherein the mixing at step b) is performed by stirring a mixture of the liquid pitch and the pulverized natural graphite with a mixer at a speed of 100 to 800 rpm for 2 to 8 hours at a temperature of 50 to 200° C.,
wherein in step b), the amount of the pulverized natural graphite and the liquid pitch used ranges from 80:20 to 50:50 by weight percent, and
wherein step d) uses a conglomerating machine operating with a rotational force of 4,500 to 6,000 rpm, and an operating time is 150 to 260 seconds.

2. The method of claim 1, wherein in step a), the flaky natural graphite has a size of 5 to 500 μm.

3. The method of claim 1, wherein in step b), the amount of solvent and pitch used in the liquid pitch ranges from 80:20 to 50:50 by weight percent, the solvent is one or more selected from the group consisting of: mineral oil including kerosene, heavy oil, or light oil; hydrocarbon solvent including toluene or decane; heteroatom-containing solvent including acetone, tetrahydropurine, or pyridine; and mixtures thereof, and the pitch is petroleum-based pitch, coal-based pitch, or polymer resin.

4. The method of claim 1, wherein step c) removes 50% or more of the solvent used at step b).

5. The method of claim 1, wherein in step e), a heat treatment temperature is 200 to 500° C., and a heat treatment time is 0.5 to 2.5 hours.

6. The method of claim 1, wherein in step f), a particle size (D50) of the classified conglomerated graphite ranges from 5 to 30 μm, and conglomerated graphite which is out of a range of 5 to 30 μm is supplied to the step a).

7. A conglomeration graphite produced according claim 1.

8. A conglomeration graphite produced according to claim 2.

9. A conglomeration graphite produced according to claim 3.

10. A conglomeration graphite produced according to claim 4.

11. A conglomeration graphite produced according to claim 5.

12. A conglomeration graphite produced according to claim 6.

* * * * *